(12) United States Patent
Bodo

(10) Patent No.: US 9,549,543 B2
(45) Date of Patent: *Jan. 24, 2017

(54) TRAPPING DEVICE WITH JOINING MEANS

(71) Applicant: CREA, Bonneville (FR)

(72) Inventor: Lionel Bodo, Ayze (FR)

(73) Assignee: CREA, Bonneville (FR)

( * ) Notice: Subject to any disclaimer, the term of this patent is extended or adjusted under 35 U.S.C. 154(b) by 58 days.

This patent is subject to a terminal disclaimer.

(21) Appl. No.: 14/256,382

(22) Filed: Apr. 18, 2014

(65) Prior Publication Data

US 2014/0317995 A1 Oct. 30, 2014

(30) Foreign Application Priority Data

Apr. 24, 2013 (FR) ..................... 13 53727

(51) Int. Cl.
*A01M 1/10* (2006.01)
*A01M 29/34* (2011.01)
*A01G 13/10* (2006.01)

(52) U.S. Cl.
CPC ............ *A01M 1/103* (2013.01); *A01G 13/105* (2013.01); *A01M 29/34* (2013.01)

(58) Field of Classification Search
CPC .......... A01M 1/10; A01M 1/103; A01M 1/00; A01G 1/08
USPC ............. 43/107, 108, 132.1, 121; 47/50–54, 47/32.4–32.6
See application file for complete search history.

(56) References Cited

U.S. PATENT DOCUMENTS

| | | | | |
|---|---|---|---|---|
| 53,772 A * | 4/1866 | Beach | ..................... | A01M 1/18 43/108 |
| 694,208 A * | 2/1902 | Smith | ..................... | A01M 1/18 43/108 |
| 760,692 A * | 5/1904 | Humans | ................... | A01M 1/18 43/108 |
| 2,261,454 A | 11/1941 | Scheu | | |
| 2,999,479 A | 9/1961 | Carder | | |
| 4,501,088 A * | 2/1985 | Boisvert | ................. | A01M 1/02 43/118 |
| 4,630,392 A * | 12/1986 | Ferraro | ............... | A01M 25/004 43/131 |
| 4,637,164 A * | 1/1987 | Brown | ................. | A01G 13/105 43/106 |
| 5,066,024 A * | 11/1991 | Reisinger | ............. | F16J 15/3288 277/355 |
| 7,261,263 B2 * | 8/2007 | Baker | ....................... | A47F 5/04 24/24 |
| 7,845,110 B2 * | 12/2010 | Amsellem | .............. | A01G 29/00 47/48.5 |

(Continued)

FOREIGN PATENT DOCUMENTS

DE 3728731 C1 9/1988
FR 2691045 A1 * 11/1993 ........... A01G 13/105

(Continued)

*Primary Examiner* — Marc Burgess
(74) *Attorney, Agent, or Firm* — William H. Eilberg

(57) ABSTRACT

A device (1) for trapping animal pests such as caterpillars, having a collar (2) which is designed to surround the trunk of a tree (3), the collar (2) including a substantially annular walkway (4) that extends substantially in a first plane (P1) that is intended to be oriented horizontally. Joining means (31) including an arrangement (32) of flexible bristles (33) having a suitable density prevent the animal pests from passing between the collar (2) and the trunk of the tree (3).

5 Claims, 8 Drawing Sheets

(56) References Cited

U.S. PATENT DOCUMENTS

2003/0178778 A1* 9/2003 Szymbor .............. F16J 15/3288
277/355

FOREIGN PATENT DOCUMENTS

FR 2827120 A1 1/2003
FR 2946834 A1 12/2010

* cited by examiner

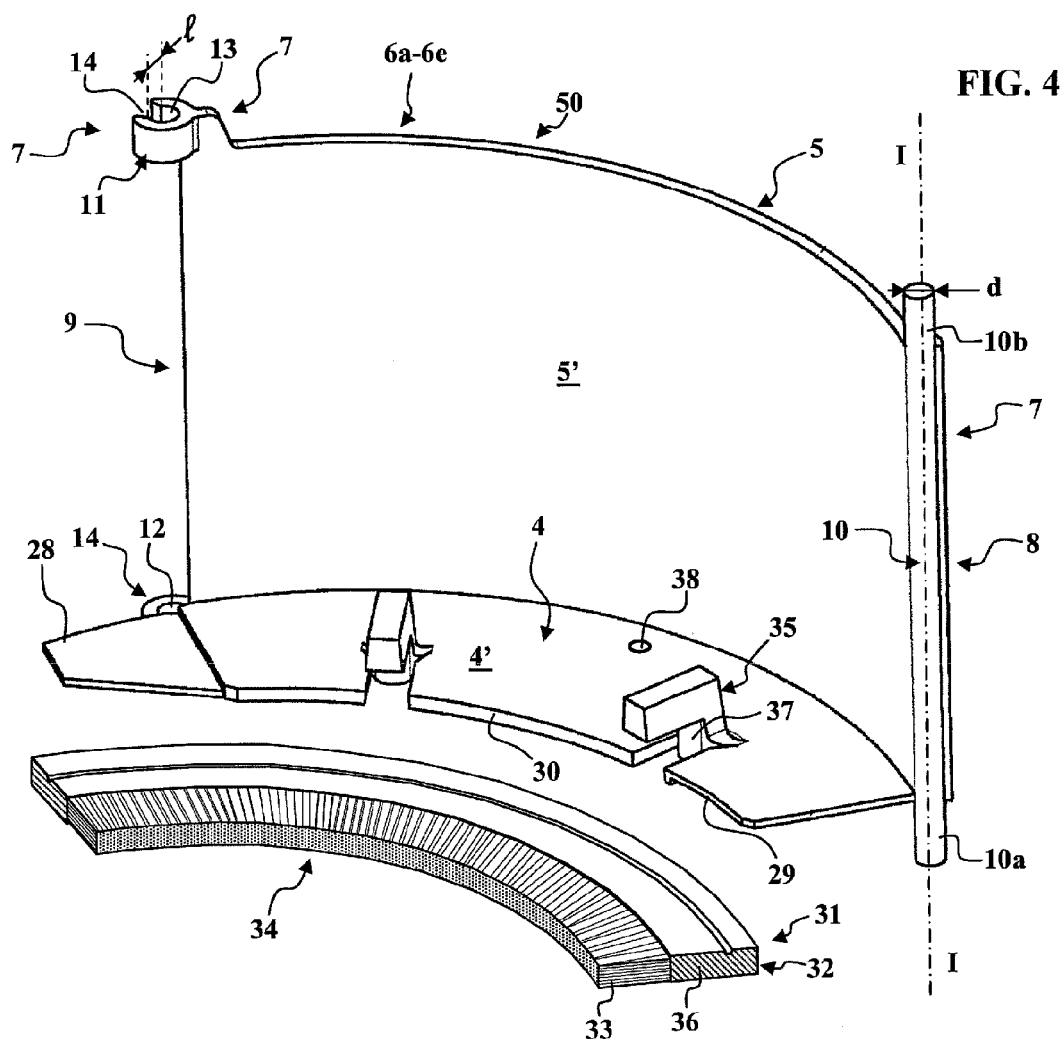
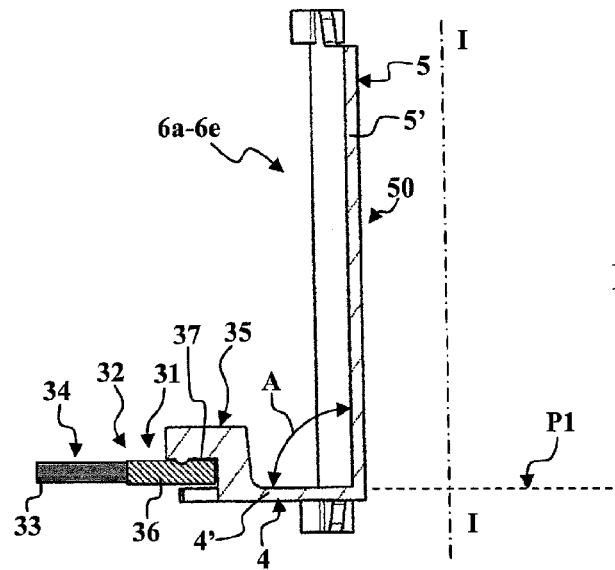

TRAPPING DEVICE WITH JOINING MEANS

TECHNICAL FIELD OF THE INVENTION

The present invention relates to a device for trapping animal pests that develop on trees or attack trees, such as caterpillars and more particularly pine processionary caterpillars.

In order to combat such animal pests as they climb up or down the trees, traps are known that have a collar which is designed to surround the trunk of a tree, said collar comprising a substantially annular walkway that extends substantially in a first plane that is intended to be oriented horizontally.

A trapping device of this type is for example described in the document FR 2 946 834 A1. In order to prevent as completely as possible the animal pests from passing through the gap present between the collar and the trunk of the tree, this document recommends the use of joining means that consist of a sealing bead made of mastic.

The production of a sealing bead from mastic requires the provision and handling of a quickly perishable pasty material. The production of this sealing bead is not very easy, since it is necessary to fill with mastic all of the hollows in the bark of the tree along a peripheral ring around which the trap should be installed. Moreover, a seal produced by way of mastic marks the bark of the tree and partially tears it off during the removal of the trapping device.

The document DE 37 28 731 C1 describes a barrier for protecting against snails and slugs in order to protect crops.

The document U.S. Pat. No. 2,261,454 A describes a trapping device having a plurality of collar sections that are connected together in a removable manner by way of added screws or in a non-removable manner by way of rivets. Provision is not made of joining means between the trapping device and the trunk of the tree.

The document U.S. Pat. No. 2,999,479 A describes an annular collar, the inner edge of which is provided with radial slits in order to form tabs that are intended to bend to a greater or lesser extent while the collar is being fitted around the trunk of a tree. The spacing between the tabs thus depends on the diameter of the trunk of the tree on which the collar is fitted. The trapping effect is thus not ensured, since, on some trees, the space available between two tabs may suffice to allow animal pests to pass between the trunk of the tree and the trapping device, while it will be small enough to block the animal pests on other trees.

SUMMARY OF THE INVENTION

A problem proposed by the present invention is to design an effective trapping device, which is quick and easy to install, and provides a satisfactory join between the collar and the tree in order to prevent animal pests from passing between the collar and the trunk of the tree.

At the same time, the invention aims to design a trapping device which adapts easily to the most often noncircular shape of the periphery of the trunk of trees.

In order to achieve these objects and others, the invention proposes a device for trapping animal pests such as caterpillars, having a collar which is designed to surround the trunk of a tree, said collar comprising a substantially annular walkway that extends substantially in a first plane that is intended to be oriented horizontally, and comprising joining means that are intended to join the collar to the trunk of the tree; according to the invention, the joining means comprise an arrangement of flexible bristles having a density suitable for preventing the animal pests from passing through.

The flexible bristles adapt the trapping device precisely to the irregular convex contour of the tree, if necessary passing into the hollows in the bark and thereby effectively blocking the animal pests. Tests have demonstrated the very great effectiveness of such joining means in the trapping of processionary caterpillars.

Such joining means are quick and easy to install but also to remove without affecting the tree, in contrast to a seal made of mastic.

Such joining means also make it possible to adapt the trapping device perfectly to the contour of the trunk of the tree, even though the cross section of the latter is not strictly circular. In addition, the space between the bristles does not depend on the diameter of the tree on which the trapping device is mounted, and so this space can be selected and maintained to effectively prevent the passage of given animal pests.

Advantageously, the device may comprise barrier means on the substantially annular walkway, preferably having a peripheral side wall that extends away from the substantially annular walkway in a first direction substantially perpendicular to the first plane. Alternatively or in addition, the barrier means may have a gully filled with a liquid or solid substance intended to kill or repel the animal pests, or may have an adhesive or sticky substance disposed on the walkway in order to retain the animal pests.

Preferably, the arrangement of flexible bristles is disposed such that the flexible bristles are oriented in a manner extending parallel to the first plane away from the substantially annular walkway. In the use position on the tree, the flexible bristles are thus directed in the direction of the tree to be surrounded, thereby ensuring that, when the trapping device is fitted around the tree, the bristles pass into the hollows in the bark.

Advantageously, the arrangement of flexible bristles may be a seal having flexible bristles, preferably such as brush seals sold under the commercial name of STRIBO FLEX by the company KOTI INDUSTRIEEL EN TECHNISCH BORSTELWERK BV, that is attached and fixed to the substantially annular walkway.

Preferably, the trapping device comprises means for maintaining the seal having flexible bristles in a fixed orientation, in a predetermined orientation with respect to the substantially annular walkway. Such maintaining means force the flexible bristles to pass into the hollows in the bark in order to effectively block the animal pests.

In a practical manner, it is possible to have satisfactory maintaining means by providing that:
  the seal having flexible bristles has a semirigid base body having a noncircular cross section, from which the flexible bristles extend,
  the collar has openings for receiving the seal having flexible bristles, having a noncircular cross section with a shape substantially complementary to the noncircular cross section of the base body of the seal having flexible bristles.

Advantageously, the substantially annular walkway may be provided with holes that are dimensioned to evacuate rainwater without thereby allowing the animal pests to be trapped to pass through. This avoids, in the event of heavy rain, a rise in the level of water in the collar, which would allow the animal pests to float and escape with the overflow.

Preferably, provision may be made for:

the collar to consist at least in part of a plurality of collar sections that are connected together by connecting means, said connecting means to be designed such that each collar section is connected to adjacent collar sections in a manner pivoting about axes that are oriented in a first direction substantially perpendicular to the first plane.

Since the connecting means allow adjacent collar sections to pivot with respect to one another, the collar can follow as closely as possible the contour of the trunk of the tree and adapts best to the generally noncircular peripheral surface of the trunk of the tree. This adaptation does not require the use of multiple added parts such as adjusting blocks. Moreover, this adaptation avoids the use of joining means having flexible bristles which are too long and the rigidity and density of which would not be sufficient to prevent animal pests from passing through.

Finally, this single degree of pivoting freedom between the successive collar sections allows easy manipulation of the trapping device, the relative movements between the adjacent collar sections being limited in practice to simple pivoting in one plane.

Preferably, the connecting means may be designed such that each collar section is connected to the adjacent collar sections in a removable manner. One or more collar sections can thus be added or removed in order to modify the length thereof so as to adapt it best to the perimeter of the trunk of the tree.

In practice, provision may be made for each collar section to extend between two ends, and for:
 each collar section to have, at one of its ends, a pivot pin that is oriented in the first direction,
 each collar section to have, at the other of its ends, means for receiving the pivot pin of an adjacent collar section.

Advantageously, the receiving means may have, at a distance from one another in the first direction:
 a first cylindrical receiving housing that is oriented in the first direction,
 a second cylindrical receiving housing that is oriented in the first direction and provided with a lateral introduction slot.

Preferably, provision may be made for:
 the lateral introduction slot to have a width less than the diameter of the pivot pin of an adjacent collar section,
 the second cylindrical receiving housing to be produced from a material having sufficient elasticity to allow the pivot pin of an adjacent collar section to be force-fitted into the second cylindrical receiving housing, through the lateral introduction slot.

Such connecting means are quick and easy to employ on site and do not require any tooling for joining the collar sections together or for separating them.

According to a first configuration, the collar may comprise collar sections that are all identical to one another. By only having a single type of collar section, the collar sections of the trapping device may be mass produced, for example by way of an injection-molding process with the aid of a single mold, in order to provide inexpensive production of a trapping device.

According to a second configuration, the collar may have:
 collar sections that have no opening means and are all identical to one another,
 at least one collar section that is provided with opening means comprising an orifice in the walkway that allows the animal pests confined in the volume between the trunk of the tree, the walkway and the peripheral side wall to be evacuated in a directed manner.

It is thus possible to use the trapping device to channel and capture the animal pests even when the quantity of animal pests is too high to remain contained on the collar. The trapping device can thus retain reasonable dimensions, independently of the quantity of animal pests to be captured.

In this second configuration, the trapping device only has two types of collar section, thereby making it possible, after all, to mass produce the different collar sections of the trapping device, for example by an injection-molding process with the aid of only two molds, in order to provide inexpensive production of a trapping device that is capable of channeling and capturing the animal pests.

Advantageously, the trapping device may have means for holding a tube in the orifice. This tube makes it possible to guide the animal pests gently and progressively in order to lead them into a container intended for capturing them. This is because animal pests such as caterpillars do not cross sudden differences in height.

Preferably, the trapping device may comprise removable means for retaining a container that is intended to receive and contain the animal pests that are evacuated through the orifice. The removable retaining means make it possible to periodically change the container before the latter is filled with animal pests and cannot receive any more. It is thus possible to fix an empty container for continuing trapping without removing the trapping device from the trunk of the tree. This is particularly useful given that at this time the volume between the trunk of the tree, the walkway and the peripheral side wall contains animal pests which should not be freed or disturbed.

Advantageously, the removable retaining means may comprise an internal thread for retaining, by screwing, a container of the bottle type having a neck that is provided with an external thread. The connection between the container and the trapping device is both simple and effective since it is tightly sealed so that no animal pest can escape.

Preferably, the trapping device may have one or more adapters that are intended to be screwed into the internal thread of the removable retaining means and each have an internal thread having different dimensions than those of the internal thread of the removable retaining means. The adapters allow adjustment of the internal thread onto which the container is screwed. It is thus possible to use inexpensive plastics containers that are easy to find, such as mineral water bottles with a capacity of five liters, the neck of which is generally produced in two standard dimensions.

Advantageously, provision may be made for the collar sections each to have:
 a walkway section,
 at least one tab that extends from and in continuation of the walkway section and is intended to at least partially cover the walkway section of an adjacent collar section.

The overlap between the tab and the walkway section of the adjacent collar section makes it possible to ensure satisfactory continuity of the substantially annular walkway in order to avoid the presence of gaps through which the animal pests could escape or which could hamper good circulation of the animal pests on the substantially annular walkway in order for them to reach, if necessary, the orifice in the walkway allowing directed evacuation of the animal pests toward the capturing container.

Preferably, the collar sections each have a walkway section having a concavely curved free inner edge. The collar sections thus have a free inner edge designed to best match the convex outer shape of the tree trunk.

BRIEF DESCRIPTION OF THE DRAWINGS

Further objects, features and advantages of the present invention will become apparent from the following description of particular embodiments, given in relation to the appended figures, in which:

FIG. 4 is a perspective view of a first type of collar section;

FIG. 5 is a sectional view of the collar section from FIG. 4;

DESCRIPTION OF PREFERRED EMBODIMENTS

Figure 1:
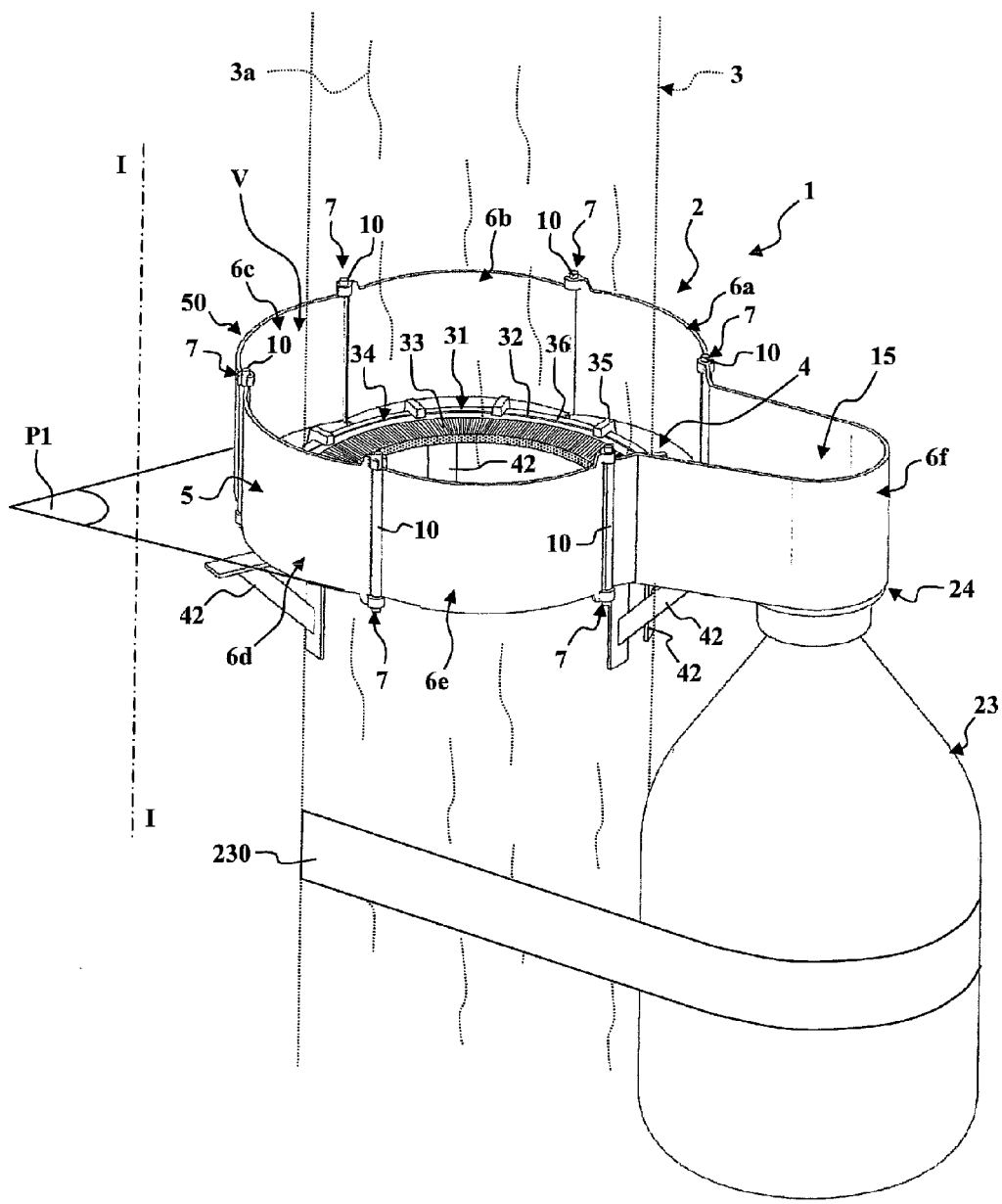
FIG. 1 is a perspective view of a trapping device according to one particular embodiment of the invention.

FIGS. 1 to 10 illustrate one particular embodiment of a device 1 for trapping animal pests such as caterpillars.

The device 1 has a collar 2 designed to surround the trunk of a tree 3, said collar 2 comprising:
- a substantially annular walkway 4 that extends substantially in a first plane P1 that is intended to be oriented horizontally,
- barrier means 50 having a peripheral side wall 5 that extends away from the substantially annular walkway 4 in a first direction I-I substantially perpendicular to the first plane P1.

The walkway 4 has a sufficient width that, in the use position around the trunk of the tree 3, the peripheral side wall 5 is spaced apart from the trunk of the tree 3 by a distance greater than the distance that can be crossed by the processionary caterpillars. A width of 2 centimeters may be appropriate.

The substantially annular walkway 4 having a peripheral side wall 5 consists of a plurality of collar sections 6a to 6f that are connected together by connecting means 7. The connecting means 7 are designed such that each collar section 6a to 6f is connected to the adjacent collar sections 6a, 6b, 6c, 6d, 6e or 6f in a manner pivoting in the first direction I-I. This allows the collar sections 6a to 6f, and thus the collar 2, to follow as closely as possible the convex contour of the trunk of the tree 3, the cross section of which is never strictly circular.

The connecting means 7 are also designed such that each collar section 6a to 6f is connected to the adjacent collar sections 6a, 6b, 6c, 6d, 6e or 6f in a removable manner so that the length of the collar 2 can be modified easily in order to adapt it best to the perimeter of the trunk of the tree 3.

It can be seen more particularly in FIG. 4 that each collar section 6a to 6e extends between two ends 8 and 9. At their end 8, the collar sections 6a to 6e have a pivot pin 10 that is oriented in the first direction I-I. At their other end 9, the collar sections 6a to 6e have means 11 for receiving the pivot pin 10 of an adjacent collar section 6a, 6b, 6c, 6d, 6e or 6f. The same goes for the collar section 6f.

Each collar section 6a to 6f is produced in one piece with its connecting means 7 comprising a pivot pin 10 and receiving means 11, thereby allowing a quick and reliable connection of each collar section 6a, 6b, 6c, 6d, 6e or 6f to the adjacent collar sections 6a, 6b, 6c, 6d, 6e or 6f without having to use added parts or tools.

Producing the collar sections 6a to 6f from plastics material makes it possible for outside weather conditions to be endured without the functioning of the trap being affected, and allows production at a reasonable cost in spite of the complexity of shape of the collar sections 6a to 6f.

More particularly, the receiving means 11 have, at a distance from one another in the first direction I-I:
- a first cylindrical receiving housing 12 that is oriented in the first direction I-I,
- a second cylindrical receiving housing 13 that is oriented in the first direction I-I and provided with a lateral introduction slot 14.

The presence of the first 12 and second 13 cylindrical receiving housings allows a quick and easy manual connection between the collar sections 6a to 6f, as will be explained below.

Since the first cylindrical receiving housing 12 is closed along its periphery, the risk of accidental disconnection between two adjacent sections 6a to 6f when a force tending to move two adjacent sections 6a to 6f apart occurs is effectively limited.

The lateral introduction slot 14 has a width l less than the diameter d of the pivot pin 10 of an adjacent collar section 6a, 6b, 6c, 6d, 6e or 6f. The second cylindrical receiving housing 13 is produced from a material having sufficient elasticity to allow the pivot pin 10 of an adjacent collar section 6a, 6b, 6c, 6d, 6e or 6f to be force-fitted into the second cylindrical receiving housing 13, through the lateral introduction slot 14. The width l of the lateral introduction slot 14 can thus momentarily increase under the effect of force-fitting so as to allow the pivot pin 10 to pass through in order to be received in the second cylindrical receiving housing 13, and can then return to its initial width l less than the diameter d of the pivot pin 10 in order to retain the latter in the second cylindrical receiving housing 13.

Figure 2:
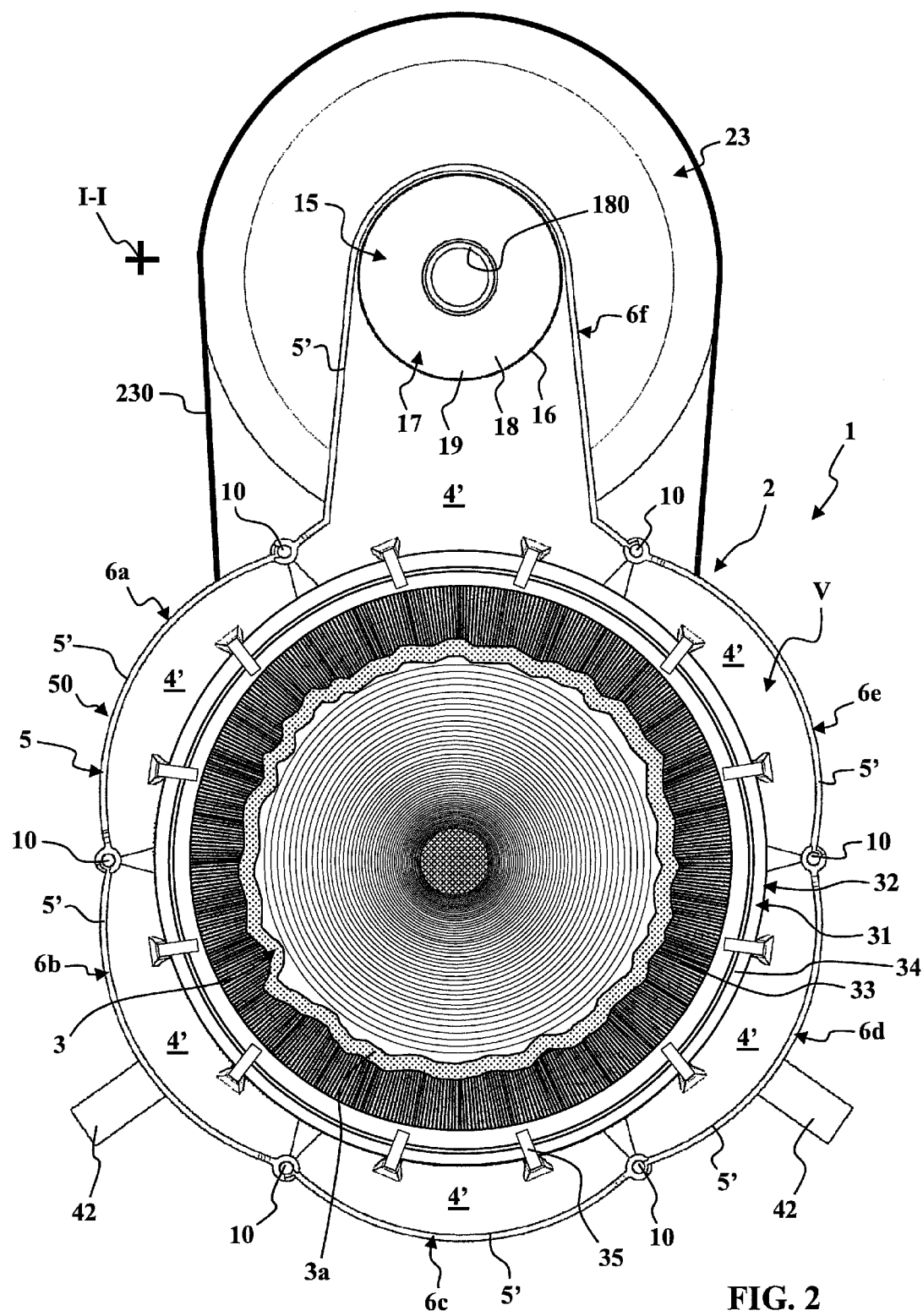
FIG. 2 is a top view of the trapping device from FIG. 1.
Figure 3:
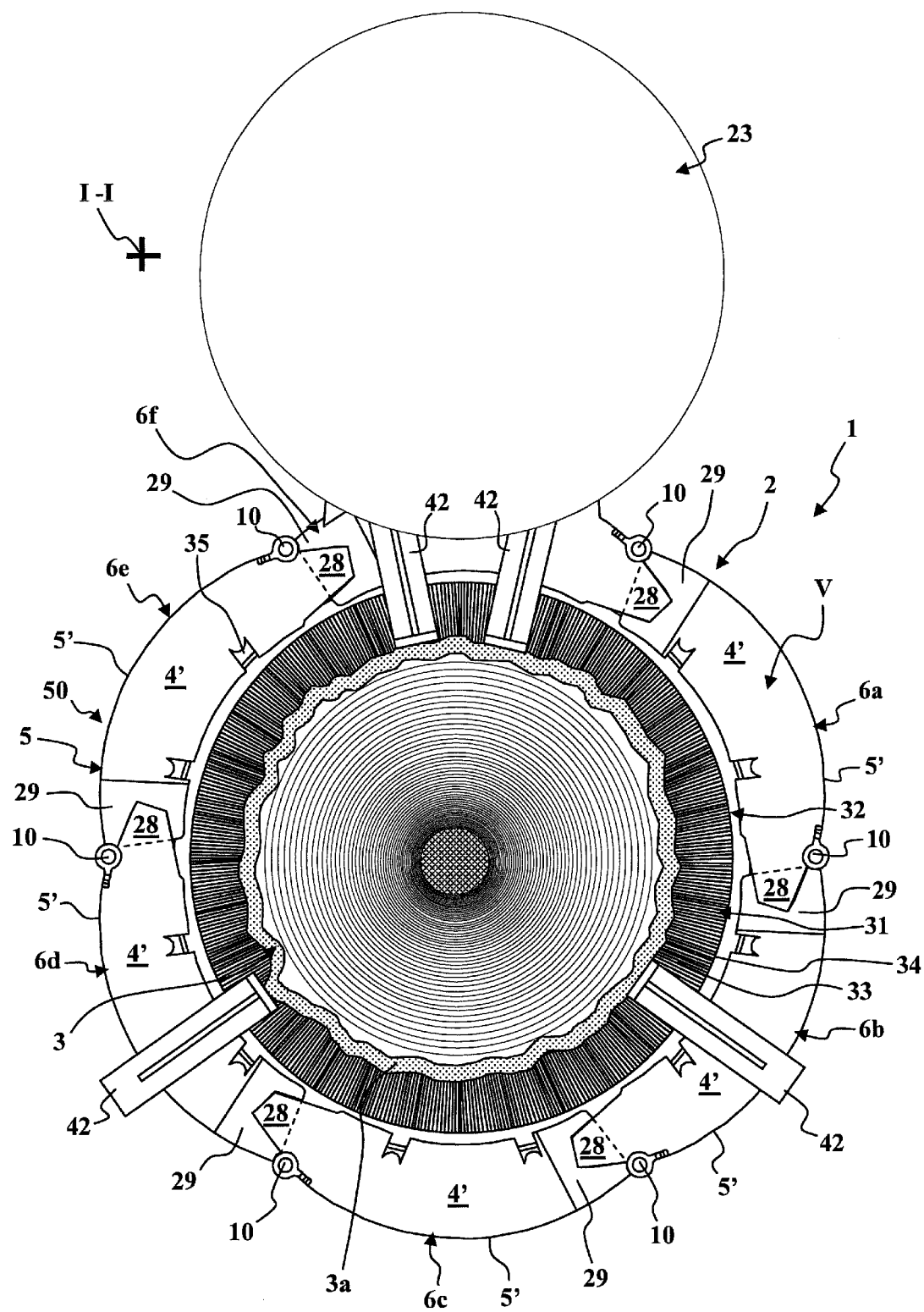
FIG. 3 is a bottom view of the trapping device from FIG. 1.

The collar 2 illustrated in FIGS. 1 to 3 has:
- collar sections 6a-6e that have no opening means 15 and are all identical to one another,
- one collar section 6f that is provided with opening means 15 comprising an orifice 16 in the walkway 4.

The opening means 15 allow directed evacuation of the animal pests confined in the volume V between the trunk of the tree 3, the walkway 4 and the peripheral side wall 5 when there are too many of them to remain on the collar 2.

In another configuration, the collar 2 may only have collar sections that are all identical to one another. To this end, it is sufficient to replace the collar section 6f having opening means 15 with a collar section that is identical to the collar sections 6a to 6e. Such a collar 2 configuration may be used when there is no need to channel and capture the animal pests, for example when a substance which is repellant, capable of killing the animal pests, adhesive or sticky is disposed on the walkway 4.

In practice, the collar sections 6a to 6f are rigid. They are for example produced by injection molding plastics material.

In the embodiment illustrated in the figures, the collar section 6f having opening means 15 allows directed evacuation of the confined animal pests toward a container 23 from which the animal pests cannot re-emerge and which, once full, could either be destroyed together with the animal pests which it contains or be emptied thereof and reused.

Figure 9:
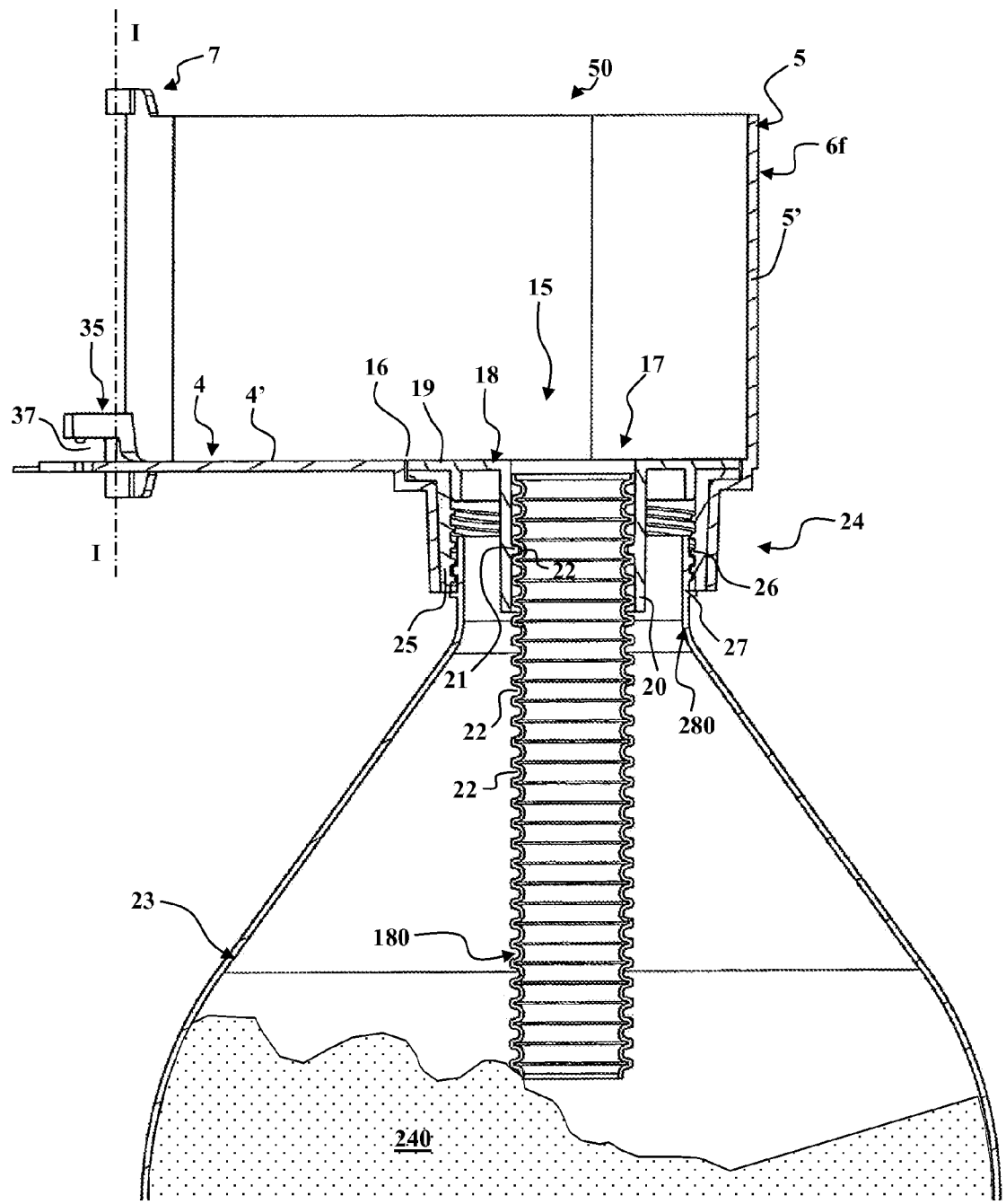
FIG. 9 is a sectional view of a second type of collar section, to which a container intended to receive and contain the animal pests is connected.
Figure 10:
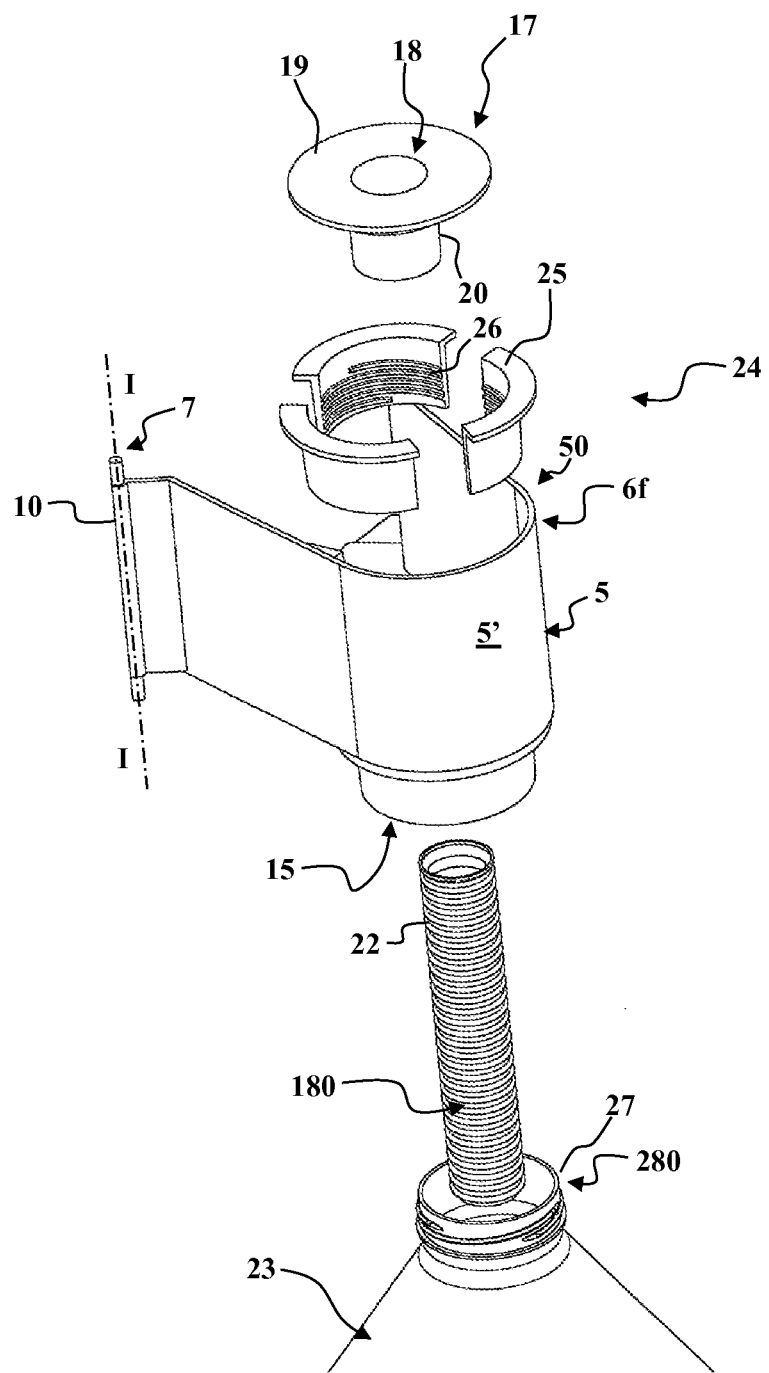
FIG. 10 is an exploded perspective view of the collar section of the second type illustrated in FIG. 9.

In order to allow the animal pests to descend progressively and without difficulty toward the interior of the container 23, the device 1 has means 17 for holding a tube 180 in the orifice 16, as is illustrated more particularly in FIG. 9. In this case, the holding means 17 comprise a ring 18 having a widened upper radial portion 19 that is fitted along its periphery into the orifice 16. The ring 18 has a tubular section 20 that is provided on its inner lateral surface with a protuberance in the form of an annular rib 21. The annular rib 21 is designed and dimensioned so as to pass into at least one annular groove 22 on the outer lateral surface of the pipe 180. This engagement of the annular rib 21 with said at least one annular groove 22 allows axial retention of the pipe 180 in the first direction I-I with respect to the collar section 6f.

In FIG. 9, it can be seen that the pipe 180 guides the descent of the animal pests from the walkway 4 toward the interior of the container 23 until the animal pests are led, at the outlet from the pipe 180, onto a material 240 such as a mixture of earth and pine needles into which the processionary caterpillars will burrow in order to transform into chrysalises.

The container 23 which is intended to receive and contain the animal pests that are evacuated from the collar 2 through the orifice 16 is fixed to the collar section 6f by removable retaining means 24. The removable retaining means 24 comprise a ring 25 that is fitted along its periphery into the orifice 16 and is provided with an internal thread 26 that is able to engage by screwing with the external thread 27 on the neck 280 of the container 23 which is a commercially available, large capacity bottle made of plastics material (for example a bottle having an internal volume of around five liters).

It is possible to screw on a container 23 having a neck 280 with different dimensions by providing a plurality of rings 25, the thickness of which is adapted such that the internal thread 26 corresponds to the different standard threads that exist on the market. Alternatively or in addition, provision can be made of one or more adapters that are intended to be screwed into the internal thread 26 of the ring 25 and respectively comprise an internal thread having different dimensions than those of the internal thread 26 of the ring 25.

In FIGS. 3 and 4, it can be seen that the collar sections 6a to 6f each have:
- a walkway section 4' (and also a peripheral side wall section 5'),
- at least one tab 28 that extends from and in continuation of the walkway section 4' and is intended to at least partially cover the walkway section 4' of an adjacent collar section 6a, 6b, 6c, 6d, 6e or 6f.

This covering is more particularly visible in FIG. 3, in which the presence of recessed housings 29 that are intended to receive the tab 28 in the covering region can also be seen.

In FIGS. 3 and 4, it can be seen that the collar sections 6a to 6f each have a walkway section 4' having a concavely curved free inner edge 30 that makes it possible to best match the convex outer shape of the trunk of the tree 3.

In FIG. 5, which is a sectional view of one of the collar sections 6a to 6e, it can be seen that the collar sections 6a to 6e have a substantially L-shaped cross section by way of their walkway 4 and their peripheral side wall 5. It should be noted that the angle A between the walkway 4 and the peripheral side wall 5 (which is 90° here) may be increased beyond 90° depending on the uses that are intended and the animal pests that are to be trapped, in order to adapt the distance between the tree trunk and the peripheral side wall 5 to the animals to be trapped. An angle A of greater than 90° can be provided, for example.

In FIGS. 1 to 5, flexible joining means 31 that are intended to join the collar 2 to the trunk of the tree 3 which has, on its circumference, numerous irregularities due to the presence of hollows and bumps in the bark 3a of the tree 3 can be seen. These flexible joining means 31 comprise an arrangement 32 of flexible bristles 33 having a density suitable for preventing the passage of the animal pests. For greater convenience of manipulation and installation, the arrangement 32 of flexible bristles 33 is a seal 34 having flexible bristles, preferably such as the brush seals sold under the commercial name of STRIBO FLEX by the company KOTI INDUSTRIEEL EN TECHNISCH BORSTELWERK BV. The seal 34 having flexible bristles is attached and fixed to the substantially annular walkway 4.

In the embodiment illustrated in FIGS. 1 to 5, the seal 34 having flexible bristles is attached and fixed to the walkway 4 in a removable manner. The device 1 comprises means 35 for maintaining the seal 34 having flexible bristles in a fixed orientation, in a predetermined orientation with respect to the substantially annular walkway 4. In this case, the seal 34 having flexible bristles has a semirigid base body 36 having a noncircular cross section, from which the flexible bristles 33 extend in a manner parallel to the first plane P1. The collar 2 has openings 37 for receiving the seal 34 having flexible bristles, having a noncircular cross section with a shape substantially complementary to the noncircular cross section of the base body 36, as can be seen more particularly in FIG. 5. The noncircular cross section of the receiving openings 37 is designed to receive and retain (for example by snap-fastening or force-fitting) the base body 36 of the seal 34 having flexible bristles.

In FIG. 4, it can be seen that the walkway section 4' is provided with a hole 38 that is dimensioned to evacuate rainwater without otherwise allowing the animal pests to be trapped to pass through. The dimension of the holes 38 is selected to be smaller than the size of the animal pests to be trapped.

Figure 6:
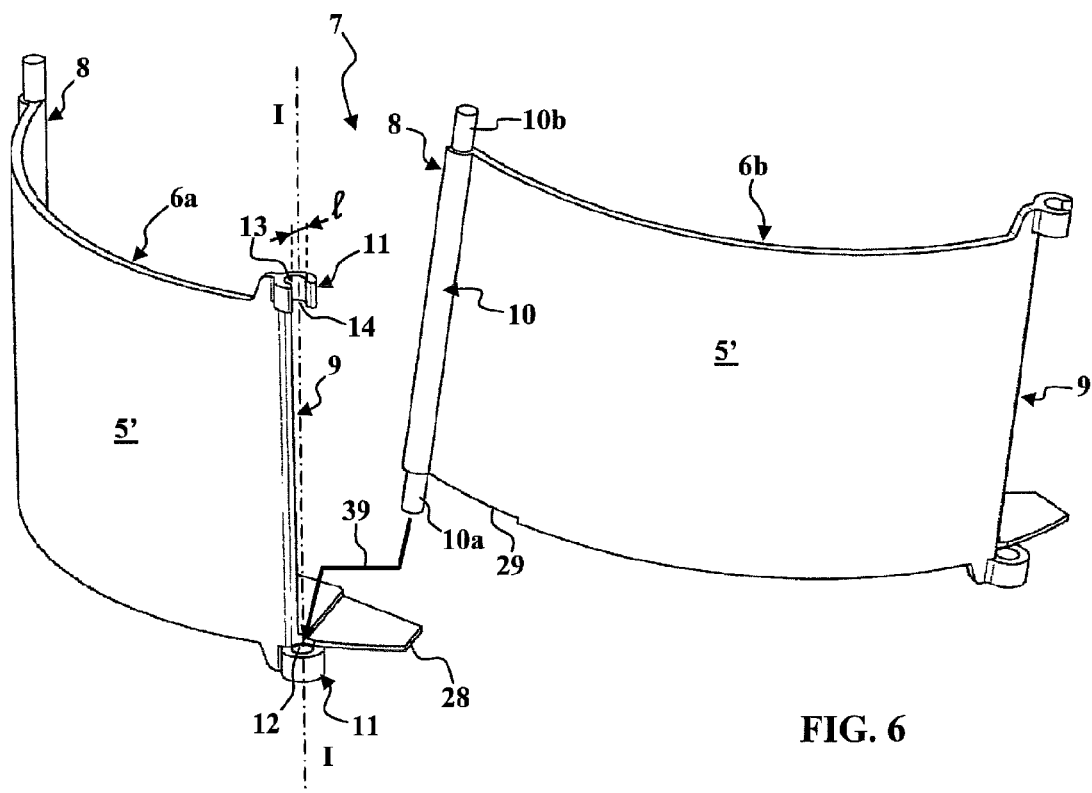
FIGS. 6 to 8 are perspective views of the assembly of two collar sections of the first type illustrated in FIG. 4.
Figure 7:
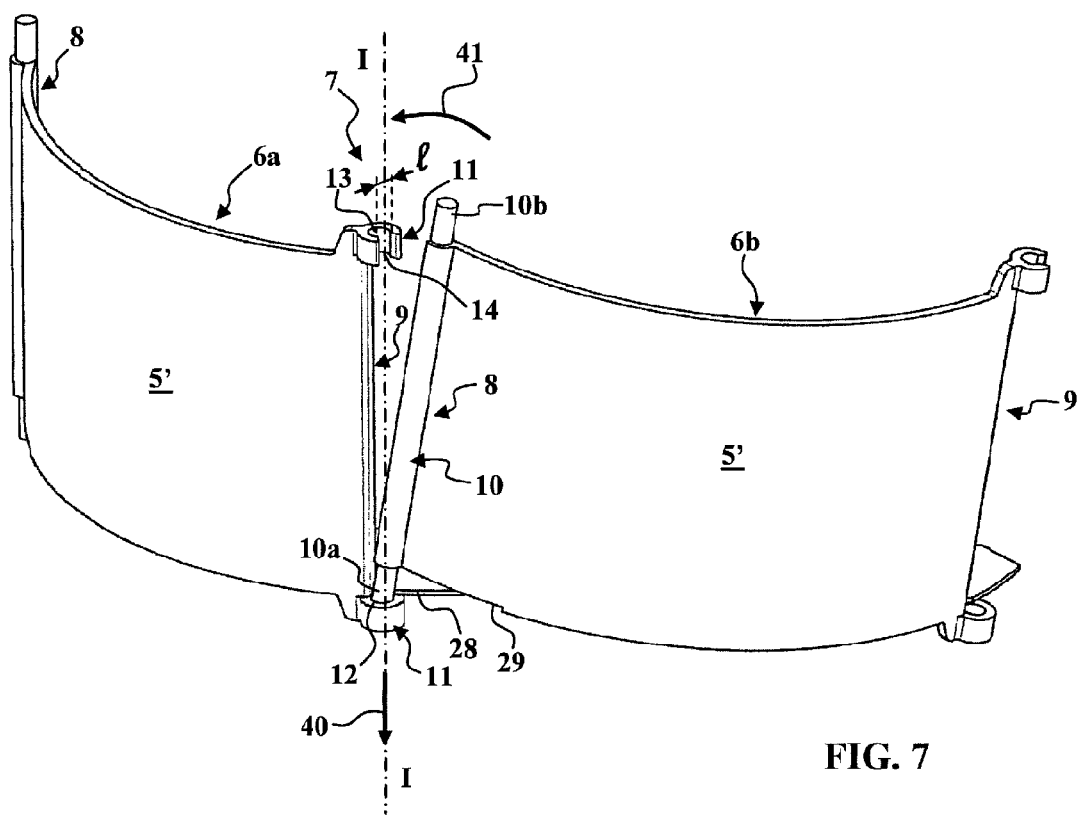
Figure 8:
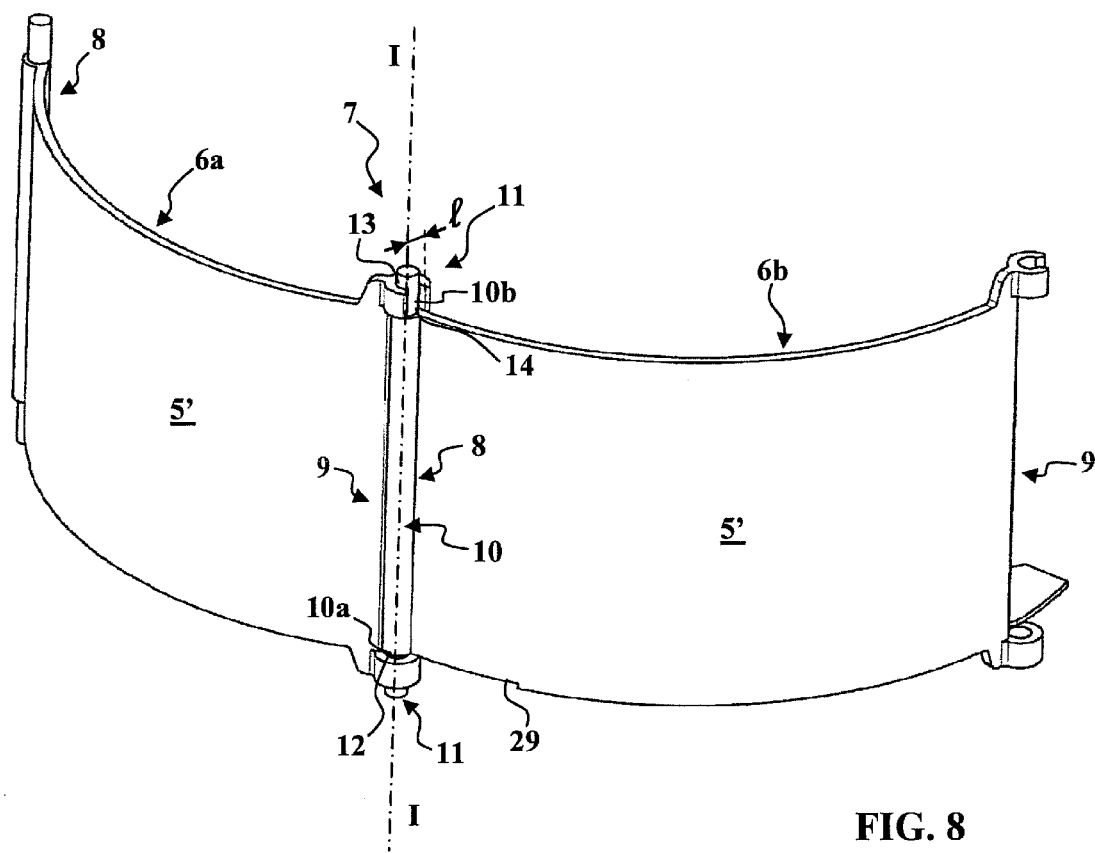

FIGS. 6 to 8 are perspective views illustrating the assembly of two collar sections 6a and 6b.

The collar section 6a is kept immobile while the collar section 6b is moved obliquely toward it in order to insert the lower end 10a of the pivot pin 10 of the collar section 6b into the first cylindrical receiving housing 12 carried at the end 9 of the collar section 6a. To this end, a movement illustrated by the arrow 39 is carried out. The collar sections 6a and 6b are then in the arrangement illustrated in FIG. 7, in which the lower end 10a of the pivot pin 10 starts to pass into the first cylindrical receiving housing 12. The penetration of the lower end 10a into the first cylindrical receiving housing 12 is then continued by a movement substantially illustrated by the arrow 40. At the same time, a tipping movement of the collar section 6b with respect to the collar section 6a is carried out, as illustrated by the arrow 41, in order to lead the upper end 10b of the pivot pin 10 into the lateral introduction slot 14. A light lateral mounting force is applied to the upper end 10b in order to force the latter to pass into the second cylindrical receiving housing 13 by causing an increase in the width l of the lateral introduction slot 14, which then returns to its initial width l by elasticity. The relative configuration illustrated in FIG. 8, in which the collar sections 6a and 6b are connected together and can pivot with respect to one another by a rotation about the first direction I-I, is then produced. The walkway sections 4' are in one and the same plane.

The collar sections 6a and 6b are separated by carrying out a reverse manipulation to that described above with the aid of the succession of FIGS. 6 to 8.

The insertion of the lower end 10a of the pivot pin 10 into the first receiving housing 12 effectively prevents any tractive force that tends to move a collar section 6a, 6b, 6c, 6d, 6e or 6f away from an adjacent collar section 6a, 6b, 6c, 6d, 6e or 6f in the plane P1. The risk of accidental disconnection between adjacent collar sections 6a to 6f is thus effectively limited.

It will be understood that the collar 2 of the device 1 according to the invention can be lengthened or shortened as desired by adding or removing a collar section, in order to have an overall length that is compatible with the perimeter of the tree 3 on which the device 1 is intended to be installed. As a result of their deformation, the joining means 31 allow the device 1 to be adapted perfectly to the irregular contour of the trunk of the tree 3 with a degree of tolerance. In particular, the longer the flexible bristles 33 are, the greater the fitting tolerance of the device 1 to the contour of the tree 3 will be. However, it is necessary to be careful not to use flexible bristles 33 that are too long, if the rigidity and density thereof are not sufficient to prevent the animal pests from passing through.

In practice, good results have been obtained with the use of bristles 33 that have a length of between around 20 millimeters and around 60 millimeters.

The use of a device 1 according to the invention will now be described in the scope of the trapping of pine processionary caterpillars.

When the branches of a tree 3 are invaded by processionary caterpillars, these caterpillars perform, at a given time, a pupation procession, descending one behind another along the trunk of the tree 3 in order to reach the ground so as to bury themselves therein and transform into chrysalises.

Prior to this pupation procession, the device 1 is placed on the trunk of the tree 3, as illustrated in FIG. 1. To this end, to start with, a sufficient number of collar sections 6a to 6f are assembled such that the device 1 has an overall length that is sufficient to surround the trunk of the tree 3. In the embodiment illustrated in FIGS. 1 to 3, the device 1 thus has six collar sections 6a to 6f that are connected to one another by connecting means 7. These collar sections 6a to 6f are assembled as explained above in connection with FIGS. 6 to 8. Once the sections 6a to 6f have been connected together, an articulated collar 2 that is capable of bending and unbending in a plane P1 that is intended to be oriented horizontally is produced. The joining means 31 are attached and fixed to the substantially annular walkway 4 formed by the end-to-end positioning of the walkway sections 4'. The peripheral side wall portions 5' for their part form barrier means 50 having a continuous peripheral side wall 5.

Before the device 1 is fitted around the trunk of the tree 3, two collar sections, for example the collar sections 6a and 6f, are left unattached. The user then surrounds the trunk of the tree 3 with the collar 2, which is deployed in the horizontal plane P1, and the collar sections 6a and 6f are connected by way of their connecting means 7 so as to form a continuous annular collar 2 around the trunk of the tree 3.

During this fitting operation, the connecting means 7 allow the collar 2, by virtue of the pivoting connection which said connecting means produce between each of the adjacent collar sections 6a to 6f, to assume a form which follows the irregularities of the periphery of the trunk of the tree 3, which is never strictly circular.

Still during this fitting operation, the bristles 33 of the flexible joining means 31 provide a perfect join between the device 1 and the trunk of the tree 3. The arrangement 32 of flexible bristles 33 is disposed in a fixed orientation by virtue of the holding means 35, with the bristles 33 oriented in a manner extending away from the substantially annular walkway 4. The bristles 33 are thus directed toward the tree 3 in order to come into contact, by way of their free ends, with the bark 3a of the tree 3, passing into the recessed irregularities in the bark 3a of the tree 3 and bending where the bark 3a of the tree 3 has bumps.

In order to ensure that the first plane P1 is kept horizontal, it is also possible to provide mounting brackets 42 that are intended to rest simultaneously against the tree 3 and under the substantially annular walkway 4.

In order to complete the installation, the ring 25 having an internal thread 26 is inserted into the orifice 16 provided in the collar section 6f, then the ring 18, to which the tube 180 is fixed, is inserted into the orifice 16.

Finally, the container 23 is screwed on by inserting the neck 280 having an external thread 27 into the internal thread 26 of the ring 25 once the container 23 has been partially filled with a material 240 based on earth and pine needles.

The configuration illustrated in FIG. 1 is thus produced.

As an alternative or in addition to the brackets 42, the container 23 and the tree 3 can be surrounded by a tie such as a strap 230, which will have the effect of keeping the device 1 on the tree 3 in a fixed manner.

As an alternative or in addition to the brackets 42 and the strap 230, the device 1 may be disposed on the tree 3 at such a height that the container 23 rests on the ground and this support helps to stabilize the device 1 on the trunk of the tree 3.

When the processionary caterpillars start their pupating procession in order to descend the tree 3, they reach the device 1 disposed on the trunk of the tree 3. The flexible bristles 33 of the flexible joining means 31 prevent the caterpillars from passing between the device 1 and the trunk of the tree 3. The caterpillars are made to split up and circulate around the substantially annular walkway 4, from where they are evacuated through the orifice 16 of the opening means 15 provided in the collar section 6f. During their descent, they follow the tube 180, which allows them to descend gently and progressively as far as the material 240 which is present in the container 23 and in which they will burrow in order to effect their transformation into chrysalises.

When the container 23 is completely full of caterpillars, the user unscrews the container 23 from the internal thread 26 of the ring 25 in order to replace it with another container 23. The container 23 full of caterpillars is then closed in a sealed manner with the aid of a cap that is screwed onto the threaded neck 280, and is then taken away in order to destroy the animal pests. The container 23, which is of the large capacity mineral water bottle type, is very solid and is difficult to pierce, and so it can be handled without fear in spite of the large quantity of highly harmful caterpillars that it contains.

The container 23 can be unscrewed without having to remove the device 1 from the trunk of the tree 3, this device 1 very often being packed with caterpillars in the volume V between the trunk of the tree 3, the walkway 4 and the peripheral side wall 5.

The trapping device 1 described in the figures is only one particular exemplary embodiment, and it should be noted that the latter can be modified structurally in order to be suitable for various uses without otherwise departing from the scope of protection of the present invention. The presence of a container 23 for collecting the animal pests and/or of a peripheral side wall 5 is entirely optional. Alternatively, the substantially annular walkway 4 may for example have a pit that is intended to be filled with a solid or liquid substance intended to kill or repel the animal pests. It may also be possible to provide the substantially annular walkway 4 with an adhesive or sticky substance that is intended to retain the animal pests.

Moreover, the above-described trapping device 1 can be used either in the orientation illustrated in the figures or in an opposite orientation in order to block and/or kill and/or capture animal pests as they climb the tree 3 or as they descend from the tree 3.

The present invention is not limited to the embodiments which have been explicitly described, but includes the various alternative forms and generalizations thereof that fall within the scope of the following claims.

The invention claimed is:

1. A method of setting a device (1) around a trunk of a tree (3), for trapping animal pests, the tree having a surface with irregularities comprising hollows and bumps, the method comprising the steps of:
    a) forming a collar (2) by connecting a plurality of collar sections (6a-6f), each collar section being connected to a plurality of flexible bristles (33), each of the bristles having a free end, the bristles being provided in a density suitable for preventing animal pests from passing through the bristles, and
    b) arranging the collar (2) around a trunk of a tree (3), such that the bristles of each collar section together form a substantially continuous seal (34) extending around a circumference of the trunk of the tree,
    wherein, in step (b), the bristles (33) are brought into contact, by way of their free ends, with the trunk of the tree, such that the bristles protrude into hollows in the trunk of the tree, and such that the bristles bend where the trunk of the tree has bumps.

2. The method of claim 1, wherein each collar section has a walkway section, wherein the bristles of each collar section are connected to said walkway section, and wherein step (b) comprises forming a generally annular walkway, for pests, around the tree.

3. The method of claim 2, wherein step (b) is performed by arranging the collar sections such that the annular walkway lies substantially in a horizontal plane (P1).

4. The method of claim 3, wherein each collar section includes a barrier section which is substantially perpendicular to the walkway section, and wherein step (b) includes the step of forming a barrier around the tree, such that the barrier is substantially perpendicular to the horizontal plane (P1).

5. The method of claim 4, wherein at least one collar section has an opening (15) defining an orifice (16), and threaded removable means (24) for retaining a container (23) intended to receive and contain animal pests that are evacuated through the orifice, and wherein the method includes screwing the container onto the removable retaining means.

* * * * *